(12) United States Patent
Lykken et al.

(10) Patent No.: US 6,318,484 B2
(45) Date of Patent: *Nov. 20, 2001

(54) TRACKED SUSPENSION

(75) Inventors: Thomas G. Lykken; Brian D. Vik; Timothy J. Bock; Russell V. Stoltman, all of Fargo, ND (US)

(73) Assignee: Case Corporation, Racine, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/399,870

(22) Filed: Sep. 20, 1999

(51) Int. Cl.$^7$ ................................................. B62D 55/00
(52) U.S. Cl. ........................ 180/9.48; 180/9.1; 305/120; 305/131; 305/135
(58) Field of Search .................. 180/9, 9.1, 9.21, 180/9.46, 9.48, 9.62, 9.26; 305/135, 199, 120, 131, 134, 132, 138

(56) References Cited

U.S. PATENT DOCUMENTS

| | | | |
|---|---|---|---|
| 1,112,460 | * | 10/1914 | Leavitt ................................. 305/135 |
| 1,276,035 | * | 8/1918 | Crane .................................. 180/9.21 |
| 1,710,116 | | 4/1929 | Sembera . |
| 2,467,947 | * | 4/1949 | Skelton ................................ 305/135 |
| 2,535,762 | | 12/1950 | Tapp et al. . |
| 2,618,349 | | 11/1952 | Ludema . |
| 2,650,104 | | 8/1953 | Grace . |
| 2,681,231 | | 6/1954 | Kondracki . |
| 2,894,341 | | 7/1959 | Amthor et al. . |
| 3,494,439 | | 2/1970 | Kline . |
| 3,674,105 | | 7/1972 | Egli . |
| 3,712,398 | | 1/1973 | Althaus . |
| 3,749,193 | | 7/1973 | Blase et al. . |
| 3,841,424 | * | 10/1974 | Purcell et al. ....................... 305/135 |
| 3,894,598 | | 7/1975 | Yeou . |
| 3,990,528 | * | 11/1976 | Haak et al. ......................... 180/9.62 |
| 3,998,286 | | 12/1976 | Ponikelsky et al. . |
| 4,132,317 | | 1/1979 | Arendt et al. . |
| 4,431,074 | | 2/1984 | Langerud . |
| 4,448,273 | | 5/1984 | Barbieri . |
| 4,457,388 | | 7/1984 | Koehler et al. . |
| 4,966,242 | * | 10/1990 | Baillargeon ........................ 180/9.46 |
| 5,072,800 | * | 12/1991 | Price .................................. 180/9.48 |
| 5,273,126 | * | 12/1993 | Reed et al. ......................... 180/9.21 |
| 5,388,656 | * | 2/1995 | Lagasse .............................. 180/9.21 |
| 5,598,896 | | 2/1997 | Haest . |
| 5,607,210 | | 3/1997 | Brazier . |
| 5,638,908 | | 6/1997 | Masumoto et al. . |
| 5,829,848 | * | 11/1998 | Kelderman ......................... 305/135 |
| 5,924,503 | * | 7/1999 | Lykken .............................. 180/9.62 |
| 5,984,032 | * | 11/1999 | Gremillion et al. ................ 180/9.1 |
| 6,176,334 | * | 1/2001 | Lorenzen ........................... 180/9.48 |

FOREIGN PATENT DOCUMENTS

| | | | | |
|---|---|---|---|---|
| 4004710 | * | 8/1991 | (DE) ................................. 305/135 |
| 925032 | * | 8/1991 | (GB) ................................. 180/9.21 |
| 5294246 | * | 11/1993 | (JP) ................................... 180/9.1 |

* cited by examiner

Primary Examiner—Daniel G. DePumpo
(74) Attorney, Agent, or Firm—Foley & Lardner

(57) ABSTRACT

A tracked suspension for a tractor or other work vehicle is disclosed having an endless belt, a belt tensioner, a drive wheel, and a plurality of idler wheels mounted to a suspension frame or idler carriage, the assembly being arranged such that the belt tension provided by the tensioner is absorbed within the frame and is not transmitted to the axle extending from the tractor that drives the tracked suspension. The tracked suspension can be adjusted by loosening or removing mounting bolts that fix the suspension to beams extending from the vehicle, sliding the suspension toward or away from the vehicle, and tightening the bolts. By absorbing the belt tensioning forces within the tracked suspension itself, rather than transmitting the belt tensioning forces to the axle, the suspension can be more easily adjusted without requiring the removal and replacement of the drive axle.

25 Claims, 4 Drawing Sheets

TRACKED SUSPENSION

FIELD OF THE INVENTION

The invention relates generally to tracked vehicles having adjustable suspensions. More particularly, it relates to agricultural tractors with tracked suspensions having lateral adjustability and internal track strain absorption.

BACKGROUND OF THE INVENTION

Tracked vehicles have been provided for use in agricultural operations that provide a fixed track width. One of the reasons the tracked width is fixed is because the drive axle extending from the vehicle and coupled to the drive wheel is neither easily removable or adjustable since it must be strong enough to resist bending forces applied to it by the track spring tension. It is an object of this invention to provide an agricultural tractor that is more easily adjusted for lateral track width. It is an object of this invention to provide such a tractor by absorbing track tension stresses within the tracked suspension itself, and not transmitting them to the drive axle.

SUMMARY OF THE PRESENT INVENTION

In accordance with the first embodiment of the invention, a tracked suspension for a work vehicle is provided including an endless track, a suspension frame configured to be slidably and fixedly mounted to at least one suspension beam extending from a frame of the vehicle, a beam extending parallel to a direction of travel and pivotally coupled to the suspension frame about a first pivotal axis substantially perpendicular to the direction of travel, a first idler wheel coupled to a fore portion of the beam and rotatable with respect thereto, a second idler wheel coupled to a rearward portion of the beam and rotatable with respect thereto, a belt tensioner configured to tension the endless track, a drive wheel support fixed to the suspension frame, a drive wheel rotatably coupled to the drive wheel support and having a drive wheel rotational axis, and a drive wheel axle rotationally coupled to the drive wheel to drive the drive wheel in rotation, wherein the track tensioner is disposed to tension the track about the periphery of the drive wheel and the first and second idler wheels without transferring tension to the drive wheel axle.

Other principal features and advantages of the invention will become apparent to those skilled in the art upon review of the following drawings, the detailed description and the appended claims.

Figure 1:
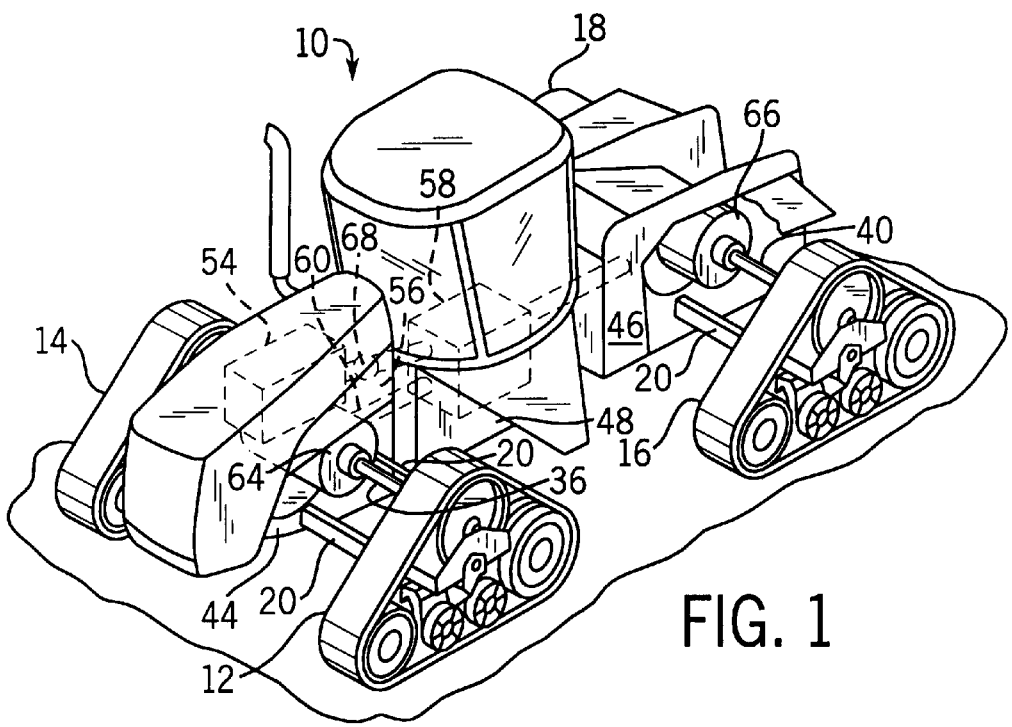
FIG. 1 is a perspective view of an agricultural tractor in accordance with the present invention having left and right front and left and right rear tracked suspensions, each supported on beams extending from the tractor.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Figure 2:
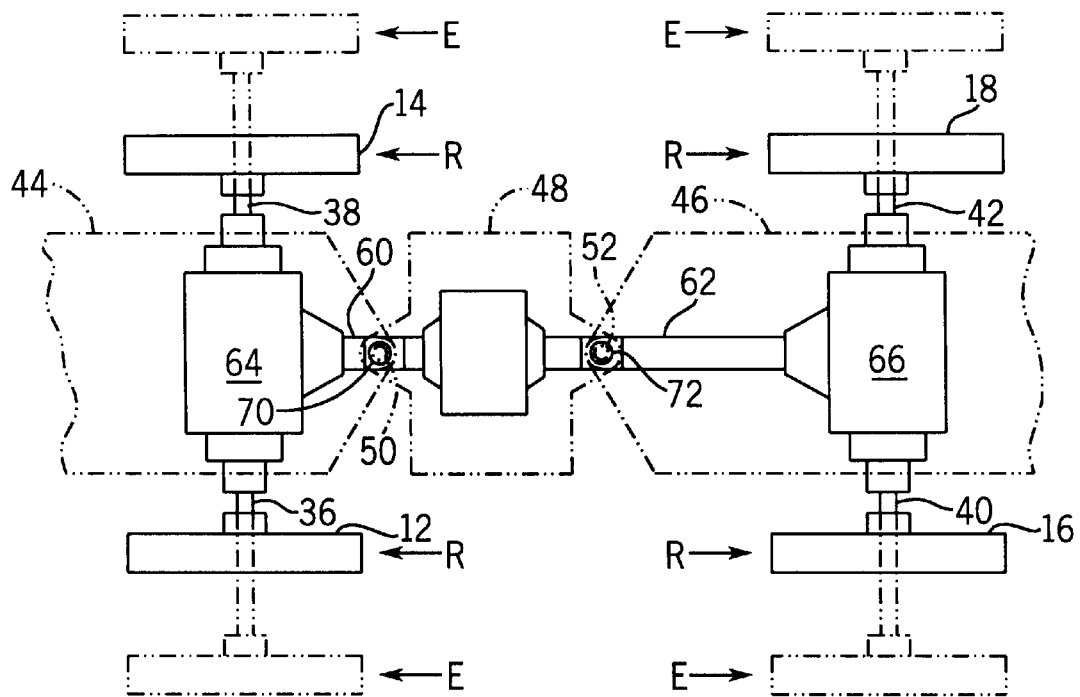
FIG. 2 is a top view of the tractor of FIG. 1, showing the track arrangement of the tracked suspensions, in an extended and retracted position, together with the differentials and transmission.
Figure 3:
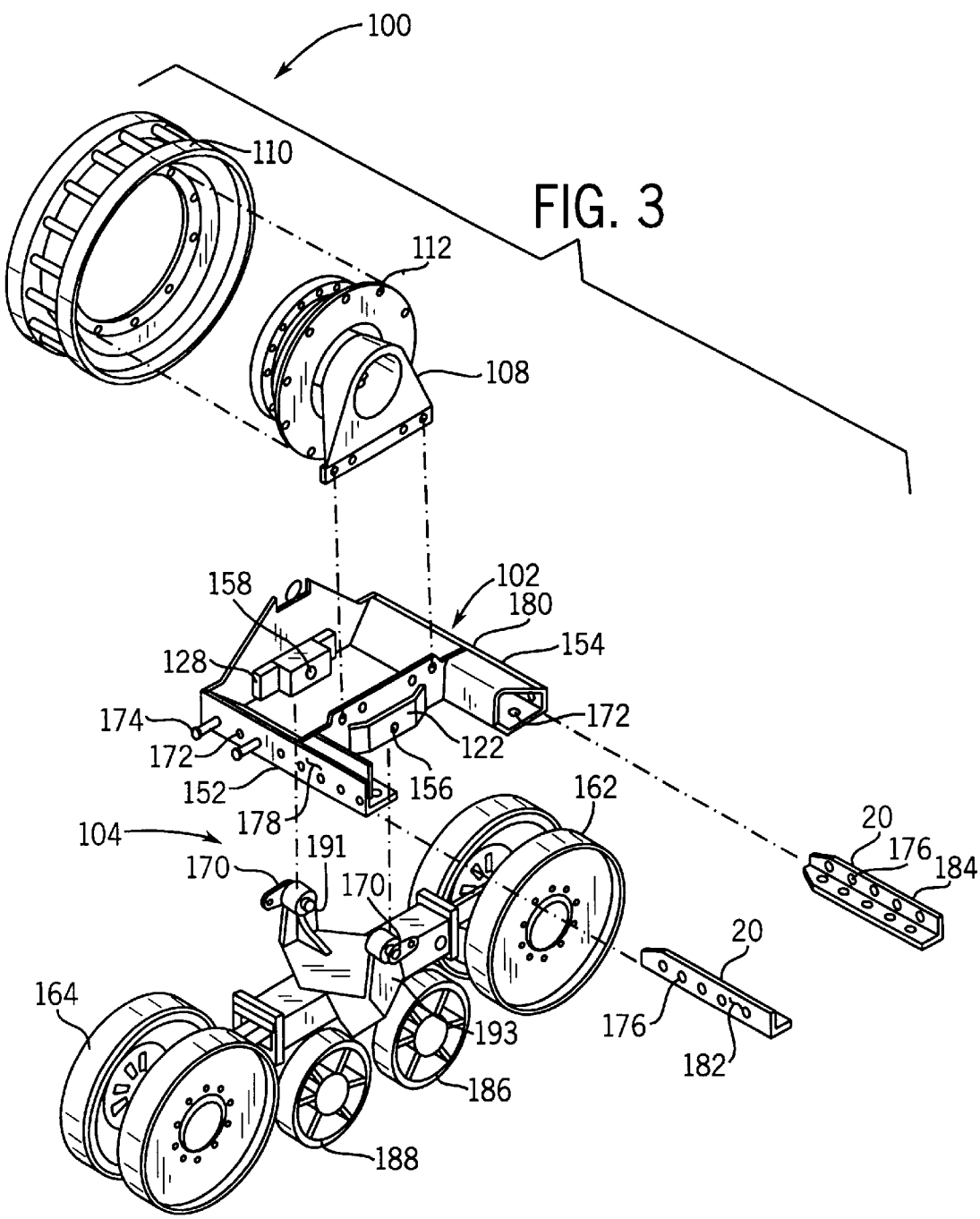
FIG. 3 is an exploded perspective view of a typical tracked suspension of the tractor of FIGS. 1 and 2.
Figure 4:
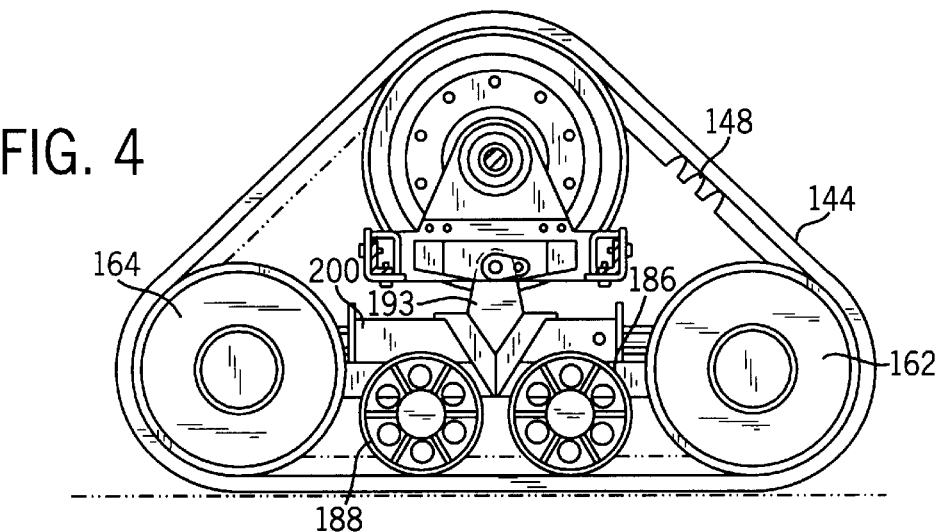
FIG. 4 is a side view of a typical tracked suspension of the tractor of FIGS. 1–3 from the tractor side of the suspension.
Figure 5:
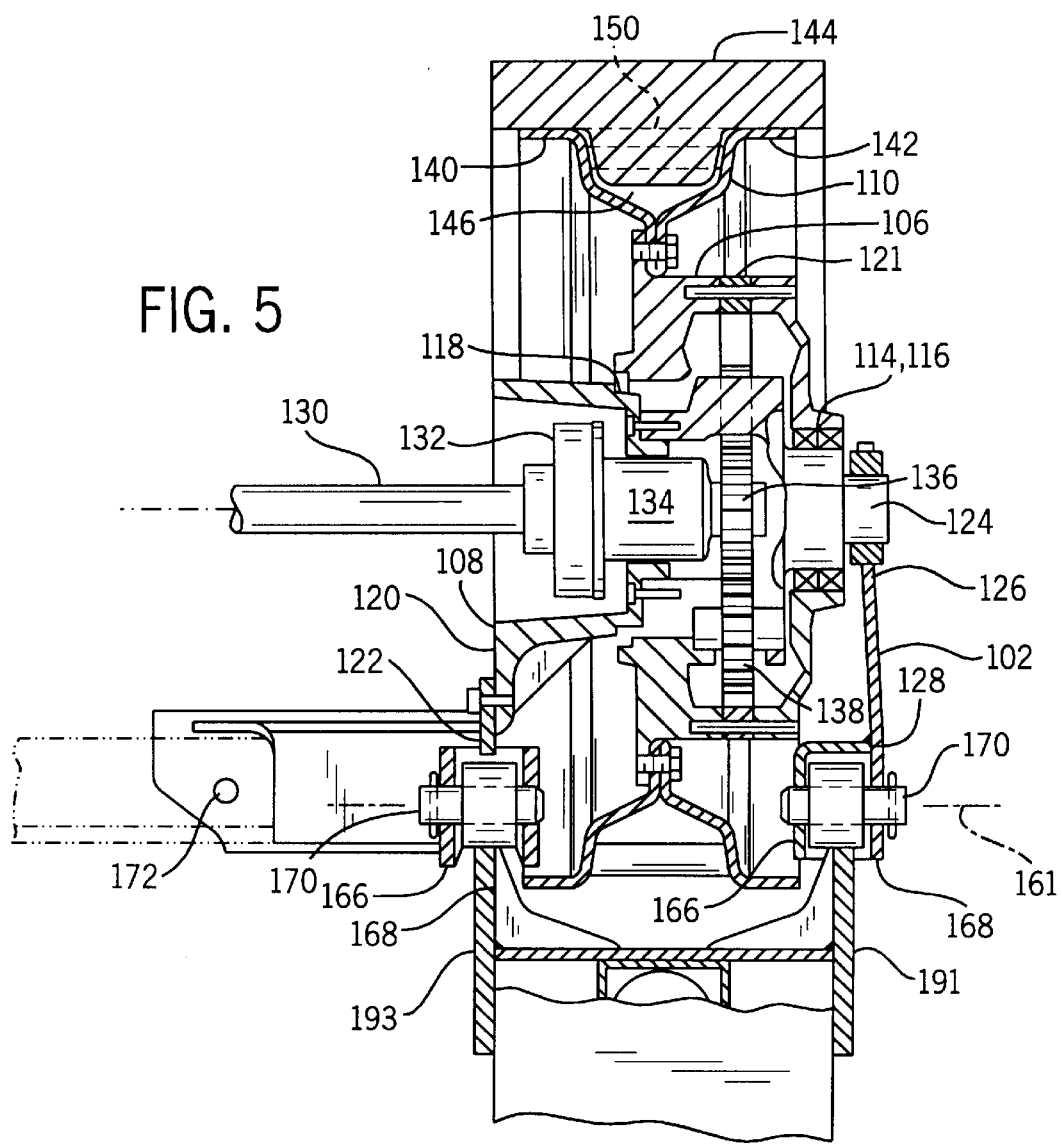
FIG. 5 shows a partial cross-sectional view of a drive wheel and drive wheel support for a typical suspension of the tractor of FIGS. 1–4.
Figure 6:
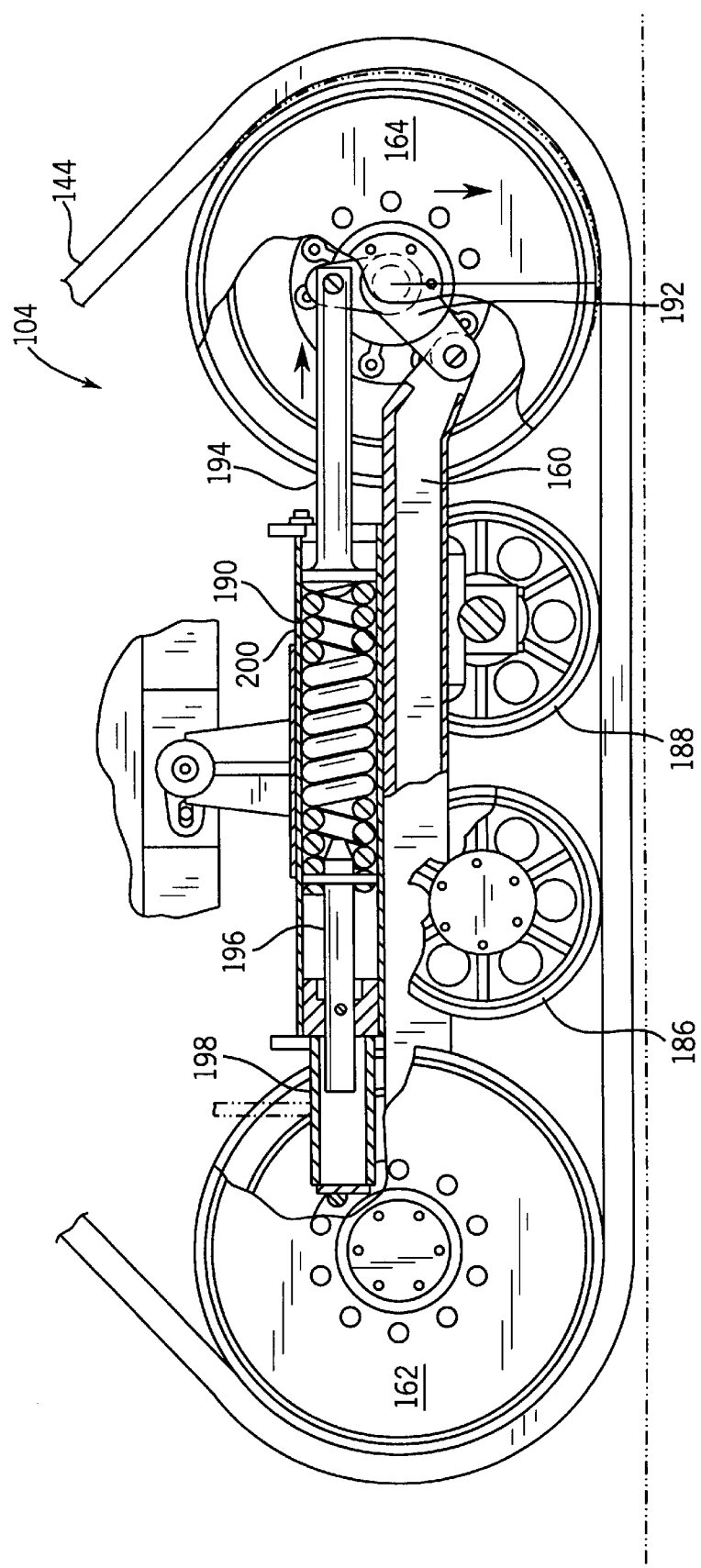
FIG. 6 is a partial cross-sectional view of an idler beam and associated idler wheels and roller wheels.

Referring to FIGS. 1–6, an agricultural tractor 10 is illustrated supported by four tracked suspensions 12, 14, 16, 18. Each of these suspensions is slidably mounted on two associated beams 20, extending laterally outward from the vehicle at each suspension point. The beams are preferably disposed in a fore-and-aft arrangement such as that shown from right front suspension 12 in FIG. 1.

Suspensions 12, 14, 16, 18 are each driven by drive axles 36, 38, 40, 42. The left front and right front suspensions are coupled to a front frame 44, the left rear and right rear suspensions are coupled to a rear frame 46. The left and right front suspension beams are fixed with respect to and extend from front frame 44. The left and right rear suspension beams are fixed with respect to and extend from rear frame 46. A middle frame 48 is provided that is pivotally coupled to both front frame 44 and rear frame 46 via two articulation joints 50, 52. Front articulation joint 50 pivotally couples front frame 44 and middle frame 48 and permits pivotal movement between the two, primarily in a horizontal plane. Rear articulation joint 52 is coupled between middle frame 48 and rear frame 46 and permits pivotal motion between middle frame 48 and rear frame 46, primarily in a horizontal plane.

Engine 54 is fixedly mounted to front frame 44 and drives the tractor 10. It is coupled via a drive shaft 56 to transmission 58 which is driven by engine 54. Transmission 58, in turn, drives front drive shaft 60 and rear drive shaft 62. Front drive shaft 60 is coupled between transmission 58 and front differential 64 and transmits power from transmission 58 to front differential 64 to drive front differential 64. Rear drive shaft 62 is similarly coupled between transmission 58 and rear differential 66 and transmits power from transmission 58 to rear differential 66.

Front differential 64 drives laterally opposed left front suspension 12 and right front suspension 14. Rear differential 66 drives laterally opposed left rear suspension 16 and right rear suspension 18. Each of the three drive shafts 56, 60, 62 includes a flexible coupling 68, 70, 72 disposed in its length to permit relative motion between the differentials and the transmission and between the transmission and the engine to allow the front, middle and rear frames to pivot with respect to each other about their flexible couplings.

Each of the four tracked suspensions 12, 14,16, and 18 are preferably the same, a single example of which is illustrated in FIGS. 3–6. The discussion below is directed to single suspension, but applies equally to all four. The tracked suspensions on the left side are mirrored on the right side of the vehicle. Internal details of the front and rear differentials are disclosed in the application entitled "Track Vehicle Track Width Adjustment," Ser. No. 09/400,510, filed contemporaneously herewith and incorporated herein by reference for all that it teaches.

Each tracked suspension includes a drive wheel assembly 100 mounted on an idler wheel carriage 102 which supports the idler and roller wheels. The idler wheel carriage is slidably supported on two beams 20 that extend laterally from the front or rear frame of the vehicle. Idler wheel carriage 102 is pivotally coupled to idler wheel assembly 104.

There are two beams extending from the left front of the vehicle which support the left front tracked suspension, two beams that extend from the from the right front of the vehicle that support the right front tracked suspension, two beams that extend from the left rear of the vehicle that support the left rear tracked suspension, and two beams that extend from the right rear of the vehicle that support the right rear tracked suspension.

The drive wheel assembly includes a drive wheel 106 rotationally supported on a drive wheel support 108. Drive wheel 106 includes a rim 110 that is bolted to drive wheel hub 112 which is supported in rotation by drive wheel support 108. Drive wheel support 108 is fixedly mounted to idler wheel carriage 102. Drive wheel 106 is supported on bearings 114, 116 and 118 which permit the drive wheel to rotate with respect to drive wheel support 108. Drive wheel 106 is driven by ring gear 121 disposed between and fixedly mounted to inner and outer portions of drive wheel hub 112. Drive wheel support 108 is fixedly mounted to idler wheel carriage 102 both on the inboard side and the outboard side of drive wheel 106. On the inboard side, a downwardly extending flange 120 of drive wheel support 108 is fixedly mounted to inboard carriage support 122. On the outboard side, a cylindrical portion 124 of drive wheel support 108 is fixedly mounted to a plate 126 extending upward from outboard carriage support 128. Drive wheel support 108 also supports an outboard end of drive axle 130 in rotation. The outboard end of drive axle 130 is rotationally coupled to flexible coupling 132, which in turn is coupled to stub axle 134. A sun gear 136 is fixedly mounted to stub axle 134 and engages a plurality of planetary gears 138 (only one shown for convenience) that are supported in rotation by drive wheel support 108. Planetary gears 138, in turn, engage and drive ring gear 121. In this manner, when drive axle 130 is rotated, it drives sun gear 136 in rotation, which drives planetary gears 138 in rotation, which drive ring gear 121 and therefore drive drive wheel hub 112 in rotation.

Rim 110 includes to axially extending flanges 140 and 142 that support and drive track 144. A recess 146 is located between the two flanges and receives lugs 148 extending inwardly from an inner surface of track 144. A plurality of axially extending rods 150 extend between and are fixed at both ends with respect to axially extending flanges 140 and 142 and across the recess. Each of these rods 150 engage lugs 148 and drive track 144 about the periphery of drive wheel 106.

Idler wheel carriage 102 serves as one exemplary suspension frame configured for being removably mounted to a suspension beam and for supporting the drive wheel and the idler wheels of driver 106 and the idler wheels 162, 164. Idler wheel carriage 102 includes two laterally extending members (or brackets) 152, 154 that are coupled to beams 20 extending from the vehicle's frame. Inboard and outboard carriage supports 122 and 128 extend between and are fixedly mounted to laterally extending members 152 and 154. Carriage support 122 is disposed inboard of drive wheel 106 and carriage support 128 is disposed outboard of drive wheel 106. Carriage supports 122 and 128 define carriage pivots 156 and 158, respectively, which pivotally support idler beam 160 of idler wheel assembly 104. In this manner, idler beam 160 is permitted to rotate about a substantially horizontal pivotal axis 161 that extends laterally with respect to the vehicle and is defined by carriage pivots 156 and 158. This pivotal axis is preferably disposed below the drive wheel's rotational axis, and above and between the rotational axes of idler wheels 162 and 164. The pivotal axis preferably intersects the drive wheel. Each of the carriage pivots includes an inboard and outboard pin supports 166, 168 having holes through which pins 170 are inserted. Pins 170 extend laterally with respect to the vehicle, and are substantially coaxial. Pins 170 are supported at their inner and outer ends by their associated inboard and outboard supports. Each of the laterally extending members 152 and 154 have a plurality of holes 172 through which bolts 174 are inserted. Similarly spaced holes 176 are provided on beams 20 to receive these bolts. To adjust the position of the tracked suspension with respect to the vehicle, the bolts are removed and the suspension is slid inward or outward on beams 20 until a new set of holes on the laterally extending members and the beams are aligned. Surfaces 178 and 180 on laterally extending members 152, 154 are substantially parallel where intersected by a horizontal plane or planes and mate with similar parallel surfaces 182, 184 on beams 20. At this point, the bolts are reinserted in the newly aligned holes and tightened. To make this adjustment relatively trouble free, alignment marks are preferably provided on at least one beam and its corresponding tracked suspension for each of the four suspensions of the vehicle.

Idler wheel assembly 104 includes an elongate horizontally extending idler beam 160 which supports idler wheels 162 and 164 (and roller wheels 186 and 188) in rotation. Pivot ears 191 and 193 are fixedly mounted to idler beam 160 and extend upwardly and outwardly to pivotally engage carriage pivots 158 and 156, respectively. In this manner, idler wheel assembly 104 and its two idler and two roller wheels, pivot with respect to drive wheel 106 about the pivotal axis defined by carriage pivots 156 and 158.

Idler wheels 162 and 164 are biased away from each other by coil spring 190 disposed between the idler wheels and above idler beam 160. Both idler wheels are in the form of two discs spaced apart from each other and sharing a common rotational axis. A pivotal link 192 is pivotally coupled to an end of idler beam 160. Idler wheel 164 is rotationally coupled to pivotal link 192, having a disk disposed on either side of pivotal link 192. An elongate member 194 is pivotally coupled to an upper end of pivotal link 192 and biases pivotal link 192 outward with respect to idler beam 160. The inner end of elongate member 194 abuts a first end of spring 190 which pushes the elongate member outward with respect to idler beam 160. A second end of spring 190 abuts piston rod 196 which extends from and is biased toward spring 190 by hydraulic cylinder 198. By filling hydraulic cylinder 198 with hydraulic fluid, piston rod 196 is forced out of the cylinder and toward the spring, compressing this spring and biasing idler wheel 164 outward. In this manner, track 144, which extends about the periphery of idler wheel 162, idler wheel 164, and drive wheel 106, can be appropriately tensioned or pre-loaded. Spring 190 is shrouded by spring housing 200 which extends around the outside of spring 190 on an upper surface of idler beam 160 and keeps dirt and other contaminants from filling the coils of spring 190. Hydraulic cylinder 198 and spring housing 200 are fixedly mounted to an upper surface of idler beam 160. Idler wheel 162 is supported by the other end of idler beam 160 and rotates with respect thereto. Roller wheels 186 and 188 are also mounted on bearings to idler beam 160 for rotation with respect to idler beam 160. These wheels are disposed between idler wheels 162 and 164 and are also in the form of two discs, one disposed on either side of idler beam 160.

Each of the above-described suspensions 12, 14, 16 and 18 have a track 144 that is tensioned without the tension being transferred to its corresponding drive wheel axle 36, 38, 40 or 42. Since each of the wheels in contact with the track 144 (idler wheels 162, 164, and drive wheel 106 in the illustrated embodiment) are supported by a suspension frame that is supported solely by a suspension beam rather than the drive axle, the track is tensioned without transferring tension to the drive wheel axle. For example, each suspension could theoretically be separated from the suspension beam as well as the drive wheel axle while the track is maintained in tension by the suspension frame, the drive wheel and the idler wheels.

Thus, it should be apparent that there has been provided in accordance with the present invention an improved tracked suspension that fully satisfies the objectives and advantages set forth above. Although the invention has been described in conjunction with specific embodiments thereof, it is evidence that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A tracked suspension for an agricultural tractor having a frame, a drive wheel axle extending from the frame and a suspension beam extending from the frame, the suspension comprising:
   an idler wheel carriage configured to be removably mounted to the suspension beam;
   a fore and aft extending idler beam having a forward portion and a rearward portion and pivotally coupled to the idler wheel carriage about a first pivotal axis;
   a rear idler wheel pivotally coupled to the rearward portion of the idler beam and rotatable with respect thereto;
   a front idler wheel pivotally coupled to the forward portion of the idler beam and rotatable with respect thereto;
   a belt tensioner coupled to at least one of the rear idler wheel and the front idler wheel to extend or retract the at least one of the rear idler wheel and the front idler wheel with respect to the idler beam;
   at least one roller wheel disposed between the front and rear idler wheels and rotatably coupled to the idler beam;
   a drive wheel support mounted to the idler wheel carriage;
   a drive wheel rotatably coupled to the drive wheel support and rotating about a drive wheel rotational axis, wherein the drive wheel is configured to be removably coupled to the drive wheel axle; and
   an endless track extending about a periphery of the at least one roller wheel, the front and rear idler wheels and the drive wheel.

2. The tracked suspension of claim 1, wherein the first and second idler wheels have first and second rotational axes extending in first and second vertical planes, respectively, wherein the drive wheel rotational axis is disposed above the first and second rotational axes of the front and rear idler wheels and between the first and second vertical planes, and further wherein the first pivotal axis is disposed below the drive wheel rotational axis.

3. The tracked suspension of claim 2, wherein the tractor includes a differential, and an axle extending from the differential, wherein the suspension includes:
   a sun gear configured to be coupled to the axle;
   a ring gear couple to the drive wheel; and
   at least one planetary gear operably coupled between the sun gear and the ring gear.

4. The tracked suspension of claim 3, wherein the beam includes a pivot ear extending from the fore and aft extending beam, and a second pivot ear extending from the fore and aft beam, each of the first and second pivot ears including a pivot at an upper end thereof that defines a first pivotal axis.

5. The tracked suspension of claim 4, further comprising inner and outer drive wheel bearings configured to support relative rotational motion of the drive wheel with respect to the drive wheel support, and further wherein the ring gear, the sun gear and the planetary gear are disposed laterally between the inner and outer wheel bearings.

6. The tracked suspension of claim 1, wherein the idler wheel carriage includes forward and rearward laterally extending members adapted to slidably receive the suspension beam extending from the tractor, the forward member disposed forward of and below the drive wheel rotational axis, and the rearward member disposed rearward of and below the drive wheel rotational axis.

7. A tracked suspension for an agricultural tractor having at least one suspension beam extending from a side of the tractor and a drive wheel axle, the suspension comprising:
   an endless track;
   a suspension frame configured to be removably mounted to at least one suspension beam;
   a beam extending parallel to a direction of travel and pivotally coupled to the suspension frame about a first pivotal axis substantially perpendicular to the direction of travel;
   a first idler wheel coupled to a forward portion of the beam and rotatable with respect thereto;
   a second idler wheel coupled to a rearward portion of the beam and rotatable with respect thereto;
   a belt tensioner configured to tension the endless track;
   a drive wheel support fixed to the suspension frame;
   a drive wheel rotatably coupled to the wheel support and having a drive wheel rotational axis, wherein the drive wheel is configured to be removably coupled to the drive wheel axle; and
   wherein the belt tensioner is disposed to tension the track about the periphery of the drive wheel and the first and second idler wheels without transferring tension to the drive wheel axle.

8. The tracked suspension of claim 7 wherein the first and second idler wheels have first and second rotational axes extending in first and second vertical planes, respectively, wherein the drive wheel rotational axis is disposed above the first and second rotational axes of the first and second idler wheels and between the first and second vertical planes, and further wherein the first pivotal axis is disposed below the drive wheel rotational axis.

9. The tracked suspension of claim 8, wherein the beam extending parallel to a direction of travel includes first and second ears extending upward from the horizontal beam, each of the first and second ears including a pivot at an upper portion thereof that defines the first pivotal axis.

10. The tracked suspension of claim 9, wherein the tracked suspension frame includes forward and rearward brackets disposed at forward and rearward portions of the suspension frame, respectively, wherein each bracket defines parallel mounting faces, wherein the parallel mounting face of the forward bracket is disposed to be fixedly mounted to the at least one suspension beam and the parallel mounting face of the rearward bracket is disposed to be fixedly mounted to at least another suspension beam extending from the vehicle.

11. The tracked suspension of claim 10, wherein the wheel support includes a sun gear and a planetary gear.

12. The tracked suspension of claim 11, wherein the wheel support includes a ring gear driven by the planetary gear.

13. The tracked suspension of claim 12, further comprising inner and outer drive wheel bearings to support the drive wheel in rotation about the wheel support, wherein the ring gear, the sun gear and the planetary gear are disposed laterally between the inner and outer wheel bearings.

14. An agricultural tractor comprising:
front frame;
first and second front suspension beams extending from opposite sides of the front frame;
first and second front axles extending from opposite sides of the front frame;
an engine fixedly mounted to the front frame;
first and second front tracked suspensions mounted to the front frame, each of the first and second front tracked suspensions including:
an endless track;
a suspension frame mounted to one of the first and second front suspension beams;
an idler beam extending parallel to a direction of travel and pivotally coupled to the suspension frame about a first pivotal axis substantially perpendicular to the direction of travel;
a first idler wheel coupled to a forward portion of the idler beam and rotatable with respect thereto;
a second idler wheel coupled to a rearward portion of the idler beam and rotatable with respect thereto;
a belt tensioner configured to tension the endless track;
a drive wheel support fixed to the suspension frame;
a drive wheel operably coupled to one of the first and second front axles and rotatably coupled to the wheel support and having a drive wheel rotational axis; and
a drive wheel axle rotationally coupled to the drive wheel to drive the drive wheel in rotation;
wherein the belt tensioner is disposed to tension the track about the periphery of the drive wheel and the first and second idler wheels without transferring tension to the drive wheel axle;
a front differential fixedly mounted to the front frame to drive front tracked suspensions;
a transmission rotationally coupled to and driven by the engine;
a rear frame pivotally coupled to the front frame;
first and second rear suspension beams extending from opposite sides of the rear frame;
first and second rear axles extending from opposite sides of the rear frame;
first and second rear tracked suspensions mounted to the rear frame each of the first and second rear tracked suspensions including:
an endless track;
a suspension frame mounted to one of the first and second rear suspension beams;
an idler beam extending parallel to a direction of travel and pivotally coupled to the suspension frame about a first pivotal axis substantially perpendicular to the direction of travel;
a first idler wheel coupled to a forward portion of the idler beam and rotatable with respect thereto;
a second idler wheel coupled to a rearward portion of the idler beam and rotatable with respect thereto;
a belt tensioner configured to tension the endless track;
a drive wheel support fixed to the suspension frame;
a drive wheel operably coupled to one of the first and second rear axles and rotatably coupled to the wheel support and having a drive wheel rotational axis; and
a drive wheel axle rotationally coupled to the drive wheel to drive the drive wheel in rotation;
wherein the belt tensioner is disposed to tension the track about the periphery of the drive wheel and the first and second idler wheels without transferring tension to the drive wheel axle; and
a rear differential fixedly mounted to the rear frame to drive the first and second rear tracked suspensions.

15. A tracked suspension for use with a work vehicle having a drive axle and at least one laterally extending suspension beam, the suspension comprising:
a suspension frame configured to be removably coupled to the at least one suspension beam;
a drive wheel rotatably supported by the suspension frame and configured to be removably coupled to the drive axle;
a plurality of idler wheels rotatably supported by the suspension frame; and
a track supported by the drive wheel and the plurality of idler wheels.

16. The suspension of claim 15, wherein the suspension frame includes a plurality of assembled components.

17. The suspension of claim 16, wherein the suspension frame includes:
an idler wheel carriage adapted to be mounted to the at least one suspension beam;
an idler beam coupled to the carriage and supporting the plurality of idler wheels; and
a drive wheel support coupled to the carriage and rotatably supporting the drive wheel.

18. The suspension of claim 17, wherein the idler beam is pivotably coupled to the carriage.

19. The suspension of claim 18, wherein the suspension frame is configured to be coupled to the at least one suspension beam at one of a plurality of positions along the at least one suspension beam.

20. The suspension of claim 15 including a belt tensioner coupled to the at least one of the plurality of idler wheels and configured to move the at least one of the plurality of idler wheels relative to the support.

21. The suspension of claim 15, wherein the plurality of idler wheels includes a first idler wheel and a second idler wheel having first and second rotational axes extending in first and second vertical planes, respectively, wherein the drive wheel rotates about an axis disposed above the first and second rotational axes of the first and second idler wheels and between the first and second planes, respectively.

22. The suspension of claim 15 including:
a sun gear adapted to be operably coupled to the drive axle;
a ring gear coupled to the drive wheel; and a planetary gear coupled between the sun gear and the ring gear.

23. A work vehicle comprising:

a frame;

a drive axle extending from the frame;

a suspension beam extending from the frame; and a suspension including:
  a suspension frame coupled to the suspension beam;
  a drive wheel rotatably supported by the suspension frame and operably coupled to the drive axle;
  a plurality of idler wheels rotatably supported by the suspension frame; and
  a track supported by the drive wheel and the plurality of idler wheels.

24. The vehicle of claim 23, wherein the suspension frame is removably coupled to the suspension beam.

25. The vehicle of claim 23, wherein the suspension frame is removably coupled to the suspension beam for movement between a plurality of positions along the suspension beam.

* * * * *